(12) United States Patent
Emira (10) Patent No.: US 7,592,791 B2
(45) Date of Patent: Sep. 22, 2009

(54) HIGH EFFICIENCY DC-DC CONVERTER USING PULSE SKIPPING MODULATION WITH PROGRAMMABLE BURST DURATION

(75) Inventor: Ahmed A. Emira, Mission Viejo, CA (US)

(73) Assignee: Newport Media, Inc., Lake Forest, CA (US)

( * ) Notice: Subject to any disclaimer, the term of this patent is extended or adjusted under 35 U.S.C. 154(b) by 234 days.

(21) Appl. No.: 11/834,950

(22) Filed: Aug. 7, 2007

(65) Prior Publication Data

US 2009/0046487 A1  Feb. 19, 2009

(51) Int. Cl.
G05F 1/56 (2006.01)
(52) U.S. Cl. .................... 323/283; 323/284
(58) Field of Classification Search ............. 323/282, 323/283, 284, 285, 351; 363/74, 78
See application file for complete search history.

(56) References Cited

U.S. PATENT DOCUMENTS

| | | | |
|---|---|---|---|
| 4,740,742 A * | 4/1988 | Gontowski, Jr. ............. 323/313 |
| 5,745,352 A | 4/1998 | Sandri et al. |
| 5,867,013 A * | 2/1999 | Yu .............................. 323/314 |
| 5,889,393 A * | 3/1999 | Wrathall ...................... 323/282 |
| 5,943,227 A | 8/1999 | Bryson et al. |
| 6,215,290 B1 * | 4/2001 | Yang et al. ................... 323/282 |
| 6,580,258 B2 * | 6/2003 | Wilcox et al. ................ 323/282 |
| 6,661,679 B1 | 12/2003 | Yang et al. |
| 6,677,808 B1 * | 1/2004 | Sean et al. ................... 327/539 |
| 6,828,762 B2 * | 12/2004 | Brkovic ....................... 323/222 |
| 7,019,507 B1 * | 3/2006 | Dittmer et al. .............. 323/284 |
| 7,034,586 B2 * | 4/2006 | Mehas et al. ................. 327/143 |
| 7,075,280 B2 | 7/2006 | May |
| 7,098,642 B2 | 8/2006 | Lipcsei et al. |
| 7,199,565 B1 * | 4/2007 | Demolli ....................... 323/273 |
| 7,254,000 B1 * | 8/2007 | Smith et al. ................... 361/56 |
| 7,315,151 B2 * | 1/2008 | Thompson et al. .......... 323/223 |
| 7,373,527 B2 * | 5/2008 | Chapuis ....................... 713/300 |
| 7,408,333 B2 * | 8/2008 | Chen et al. ................... 323/282 |
| 7,492,134 B2 * | 2/2009 | Tang et al. ................... 323/241 |
| 7,493,504 B2 * | 2/2009 | Chapuis ....................... 713/300 |
| 7,518,894 B2 * | 4/2009 | Fosler et al. .................. 363/72 |

OTHER PUBLICATIONS

Peterchev, Angel V. et al., "Quantization Resolution and Limit Cycling in Digitally Controlled PWM Converters," 2003 IEEE Transactions on Power Electronics, vol. 18, No. 1, Jan. 2003.

(Continued)

*Primary Examiner*—Adolf Berhane
(74) *Attorney, Agent, or Firm*—Rahman LLC (57) ABSTRACT

A DC-DC converter and method of improving the efficiency of a DC-DC converter at low load current levels using pulse skipping modulation (PSM) with controllable burst duration $NT_{clk}$, where $T_{clk}$ is the clock cycle interval. As the average load current increases, the time between bursts decreases so that average inductor current matches the load current. The burst duration is kept around $NT_{clk}$ by controlling the duty cycle of the output switches. The higher the load current, the higher is the duty cycle of the output switches. No current sensing is needed. The optimum burst duration for best efficiency curve is a function of the load capacitor.

20 Claims, 4 Drawing Sheets

OTHER PUBLICATIONS

Peterchev, Angel V. et al., "Digital Multimode Buck Converter Control with Loss-Minimizing Synchronous Rectifier Adaptation," 2006 IEEE Transactions on Power Electronics, vol. 21, No. 6, Nov. 2006.

Peterchev, Angel V. et al., "Architecture and IC Implementation of a Digital VRM Controller," 2003 IEEE Transactions on Power Electronics, vol. 18, No. 1, Jan. 2003.

Luo, Pin et al., "Skip Cycle Modulation in Switching DC-DC Converter," 2002 IEEE International Conference on Communications, Circuit and Systems and West Sino Expositions, vol. 2, Jun.-Jul. 2002.

* cited by examiner

# HIGH EFFICIENCY DC-DC CONVERTER USING PULSE SKIPPING MODULATION WITH PROGRAMMABLE BURST DURATION

BACKGROUND

1. Technical Field

The embodiments herein generally relate to electrical converter circuits and, more particularly, to utilizing a pulse skipping modulation (PSM) circuits to control a direct current to direct current (DC-DC) converter of an integrated circuit (IC) chip.

2. Description of the Related Art

Various types of electronic equipment, more particularly, portable or handheld electronic devices such as cellular telephones, personal digital assistants (PDAs), etc., are capable of being powered from a self-contained power source such as a battery, which may be recharged by an external power source. Moreover, these devices typically contain an integrated circuit chip(s) embedded in the device. Additionally, some interfaces may provide a power source through an interface itself such as a Universal Serial Bus (USB). A DC-DC converter may be utilized to convert the battery voltage, external voltage, or both voltages to a DC value which will supply power to various circuits of the integrated circuit chip(s). The converted voltage may be a supply voltage (rail voltage) provided to a load. However, because the load at the output of the DC-DC converter may vary substantially, the load current may also vary considerably. Furthermore, in some instances it is desirable for the DC-DC converter to be as efficient as possible in the low power state to extend the device's battery life.

However, when switched DC-DC converters are used, the converters are inherently less efficient when driving light loads because the power needed to switch the large power field-effect-transistors (FETs) is comparable or greater than the energy transferred to the load. Moreover, when driving a heavy load, the energy needed to switch the FETs is less relative to energy transferred to the load, so the efficiency is higher. A conventional technique to improve light load efficiency is to implement a pulse-frequency modulation (PFM) converter, which modulates the frequency that the DC-DC converter operates to optimize efficiency by enabling the power FETs to bring the output voltage level to a high threshold, then disabling the FETs until the voltage drops to a low threshold. This well-known technique improves efficiency by reducing the number of times the FETs are toggled to transfer power to the load.

Typically, the architecture of these PSM converters implements some form of current mode control. However, current mode control is generally difficult because it requires sensing currents, which is difficult to sense due to noise, offsets and circuit complexity. Also, sensing a current typically requires a sensing resistor, which may negatively impact efficiency. Thus, sensing current in a switched DC-DC converter may be difficult to do or may be undesirable. Accordingly, there remains a need for a new DC-DC converter having improved efficiency characteristics at low load current levels.

SUMMARY

In view of the foregoing, an embodiment provides a DC-DC converter comprising a pair of switches; a load capacitor operatively connected to the pair of switches; a pulse width modulator adapted to generate pulse signals for driving the pair of switches; an analog comparator with hysteresis adapted to control an output voltage level within a specified range, wherein as the output voltage level rises above a high threshold level, an analog comparator output becomes low and starts skipping clock pulses, wherein as the output voltage level drops below a low threshold level, the analog comparator output becomes high and a clock signal is passed to the pair of switches to charge the load capacitor, and wherein the analog comparator is further adapted to compare the output voltage level with either the low threshold level or the high threshold level; a first counter; a first register operatively connected to the first counter, wherein when the analog comparator output becomes low the first counter stops and stores its last value Non in the first register; a first digital comparator operatively connected to the first register; and an up-down counter operatively connected to the first digital comparator and the pulse width modulator, wherein during turn-on of the pair of switches, a load current at a load resistor is supplied by the pair of switches, and the load capacitor charges, wherein a turn-on time is a time when the output voltage level discharges from the low threshold level to the high threshold level through the load capacitor, wherein the turn-on time is measured by the first counter and the first register, wherein the first counter starts counting when the analog comparator output becomes high, which occurs when the output voltage level reaches the low threshold level and the pair of switches turn on, and wherein when the output voltage level reaches the high threshold level, the analog comparator output becomes low and the first counter stops counting and stores its last value, which represents the measured turn-on time, in the first register.

Preferably, the high threshold level minus the low threshold level defines a hysteresis width of the analog comparator. Moreover, a voltage coming out of the pair of switches preferably has a duty cycle controlled by the pulse width modulator. Additionally, the Non value is compared with a desired value Non_ref using the first digital comparator, wherein if Non<Non_ref, the up-down counter counts down to decrease a duty cycle of the pulse waves, and wherein if Non>Non_ref, the up-down counter counts up to increase the duty cycle of the pulse waves. Furthermore, a turn-on duration of the pair of switches is represented by the Non value preferably converges to the Non_ref at steady state. Also, once the output voltage level exceeds the high threshold level, the analog comparator output preferably becomes low and the pair of switches turn off. Preferably, when the output voltage level is lower than the low threshold level, the analog comparator output is high and the pulse signals are passed through the pair of switches. Moreover, the DC-DC converter may further comprise a second counter and a second register operatively connected to the second counter, wherein when the output voltage level reaches the low threshold level, the second counter stops counting and stores its value Noff in the second register, and wherein the value Noff is a measure of the load current.

Another embodiment provides a method of controlling voltage in a DC-DC converter, wherein the method comprises electrically connecting a pair of switches to a load capacitor; generating pulse signals with a pulse width modulator for driving the pair of switches; controlling an output voltage level within a specified range using an analog comparator with hysteresis, wherein as the output voltage level rises above a high threshold level, an analog comparator output becomes low and starts skipping clock pulses, wherein as the output voltage level drops below a low threshold level, the analog comparator output becomes high and a clock signal is passed to the pair of switches to charge the load capacitor, and wherein the analog comparator is further adapted to compare the output voltage level with either the low threshold level or the high threshold level; sending a clock signal to a first counter, wherein when the analog comparator output becomes low the first counter stops and stores its last value Non in a first register, wherein the first register is operatively connected to a first digital comparator, wherein the first digital comparator is operatively connected to an up-down counter, wherein the up-down counter is operatively connected to the pulse width modulator; turning on the pair of switches such that a load current at a load resistor is supplied by the pair of switches, causing the load capacitor to charge; and measuring a turn-on time using the first counter and the first register, wherein the turn-on-time is a time when the output voltage level discharges from the low threshold level to the high threshold level through the load capacitor, wherein the first counter starts counting when the analog comparator output becomes high, which occurs when the output voltage level reaches the low threshold level and the pair of switches turn on, and wherein when the output voltage level reaches the high threshold level, the analog comparator output becomes low and the first counter stops counting and stores its last value, which represents the measured turn-on time, in the first register.

Preferably, the high threshold level minus the low threshold level defines a hysteresis width of the analog comparator. Additionally, a voltage coming out of the pair of switches preferably has a duty cycle controlled by the pulse width modulator. Also, the Non value is preferably compared with a desired value Non_ref using the first digital comparator. Preferably, if Non<Non_ref, the up-down counter counts down to decrease a duty cycle of the pulse waves, and if Non>Non_ref, the up-down counter counts up to increase the duty cycle of the pulse waves. Moreover, a turn-on duration of the pair of switches represented by the Non value preferably converges to the Non_ref at steady state. Preferably, once the output voltage level exceeds the high threshold level, the analog comparator output becomes low and the pair of switches turn off. Additionally, when the output voltage level is lower than the low threshold level, the analog comparator output is preferably high and the pulse signals are passed through the pair of switches. The method may further comprise operatively connecting a second register to a second counter, wherein when the output voltage level reaches the low threshold level, the second counter stops counting and stores its value Noff in the second register, and wherein the value Noff is a measure of the load current.

Another embodiment provides a DC-DC converter comprising a pair of switches; a load capacitor operatively connected to the pair of switches; a pulse width modulator adapted to generate pulse signals for driving the pair of switches; an analog comparator with hysteresis adapted to control an output voltage level within a specified range, wherein as the output voltage level rises above a high threshold level, an analog comparator output becomes low and starts skipping clock pulses, wherein as the output voltage level drops below a low threshold level, the analog comparator output becomes high and a clock signal is passed to the pair of switches to charge the load capacitor, and wherein the analog comparator is further adapted to compare the output voltage level with either the low threshold level or the high threshold level; a first counter; a first register operatively connected to the first counter, wherein when the analog comparator output becomes low the first counter stops and stores its last value Non in the first register; a first digital comparator operatively connected to the first register; an up-down counter operatively connected to the first digital comparator and the pulse width modulator; a second counter; and a second register operatively connected to the second counter, wherein when the output voltage level reaches the low threshold level, the second counter stops counting and stores its value Noff in the second register, wherein the value Noff is a measure of the load current and controls the size of the pair of switches, wherein for low load current levels, the value of the Noff is high and the size of the pair of switches is decreased to reduce capacitive power losses, and wherein for high load current levels, the value of the Noff is low and the size of the pair of switches is increased to reduce resistive power losses.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a new DC-DC converter having improved efficiency characteristics at low load current levels. The embodiments herein achieve this by using pulse skipping modulation (PSM) with controllable burst durations. Referring now to the drawings, and more particularly to FIGS. 1 through 4, where similar reference characters denote corresponding features consistently throughout the figures, there are shown preferred embodiments.

Figure 1:
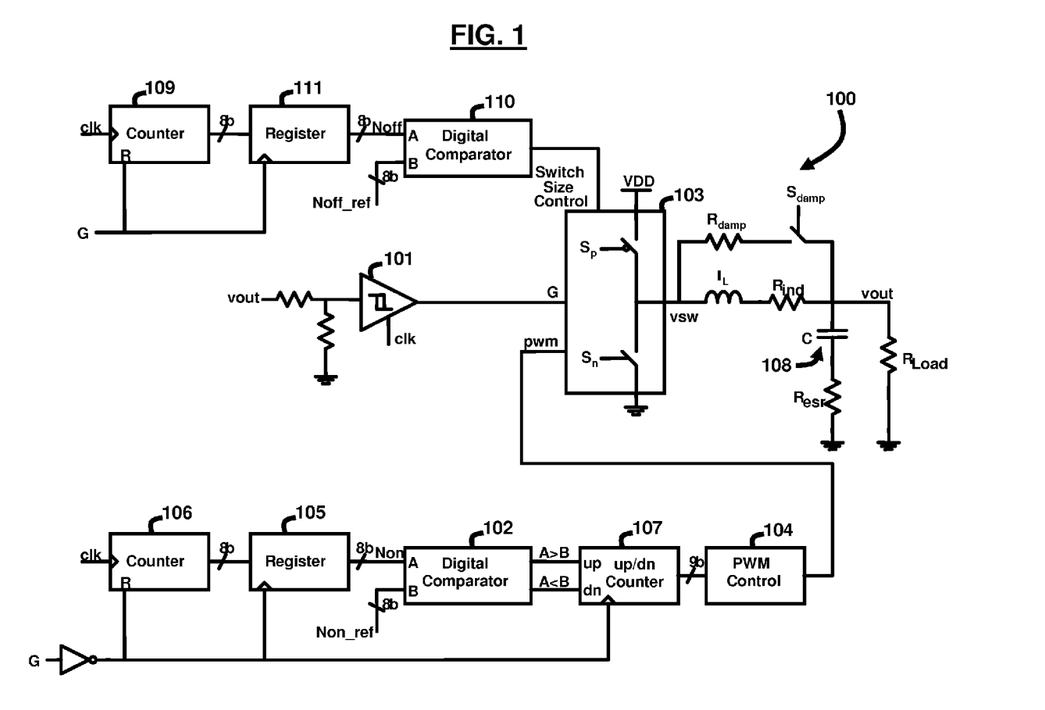
FIG. 1 illustrates a schematic diagram of a DC-DC converter according to an embodiment herein.

As mentioned, the embodiments herein provide a new technique to improve DC-DC converter efficiency at low load current levels. The new technique uses PSM with controllable burst duration $NT_{clk}$, where $T_{clk}$ is the clock cycle interval. FIG. 1 illustrates a DC-DC converter 100 according to an embodiment herein. As average load current increases, the time between bursts decreases so that average inductor current $I_L$ matches the load current. The burst duration is kept at approximately $NT_{clk}$ by controlling the duty cycle at the output of the PWM generator 104 that drives the output switches 103. The higher the load current, the higher the duty cycle of the output switches 103. No current sensing is needed in the technique provided by the embodiments herein. Moreover, there is a maximum limit on the burst duration for a best efficiency curve is a function of the load capacitor 108. This can be explained as follows: the average inductor current equals the load current as expressed below:

$$I_{ind,av} = \frac{Q}{T_{ON}} + I_{Load} = \frac{C\Delta V}{T_{ON}} + I_{Load} \qquad (1)$$

where $\Delta V$ is the hysteresis width of the analog comparator 101. To keep inductor current unidirectional for best efficiency, the following condition applies:

$$I_{av} = \frac{C\Delta V}{T_{ON}} + I_{Load} > \frac{\Delta I}{2} \qquad (2)$$

where $\Delta I$ is the inductor ripple current which is given by:

$$\Delta I = \frac{D(1-D)T_{clk}V_{DD}}{L}. \qquad (3)$$

To ensure condition (2) at all current levels, its must be current when $I_{load}=0$. Therefore:

$$T_{ON} < \frac{2C\Delta VL}{D(1-D)T_{clk}V_{DD}} \qquad (4)$$

The $N_{ON}$ is expressed as:

$$N_{ON} = \frac{T_{ON}}{T_{clk}} < \frac{2C\Delta VL}{D(1-D)T_{clk}^2 V_{DD}} \qquad (5)$$

An analog comparator 101 with hysteresis is used to control the output voltage level within a specified range. When the output rises above a high threshold voltage level, $V_{TH}$, the comparator output becomes low to start skipping clock pulses. However, at this moment, the inductor current, $I_L$, is still high. The switch $S_n$ is kept ON until the inductor current, $I_L$, goes to zero. After switch $S_n$ turns OFF, switch $S_{damp}$ turns ON to damp the residual small inductor current, $I_L$. If the output drops below the low threshold voltage level, $V_{TL}$, the comparator output becomes low and the clock signal $V_{CLK}$ is passed to the switches $S_p$ and $S_n$ to charge the load capacitor 108 and the switch $S_{damp}$ is turned OFF. Moreover, the $S_{damp}$ and $R_{damp}$ dampen LC oscillations when the switches $S_n$ and $S_p$ are turned OFF.

The analog comparator 101 compares the output voltage level, vout, with either a low threshold voltage level, $V_{TL}$ or high threshold voltage level, $V_{TH}$. In this regard, $V_{TH}-V_{TL}$ defines the hysteresis width (and therefore, the output voltage ripple). Moreover, in the context of the embodiments herein $V_{TL}$ equals −1 to −5% of the target threshold voltage level and $V_{TH}$ equals 1 to 5% of the target threshold voltage level. If a smaller output voltage ripple is required, then smaller $V_{TH}-V_{TL}$ should be used, which will have an impact on the maximum $N_{ON}$ that can be used according to equation (5). If the output voltage level, vout, is lower than $V_{TL}$, the comparator output will be high and the pwm (pulse width modulated) pulses from PWM control 104 are passed through the driver switches 103.

Figure 2:
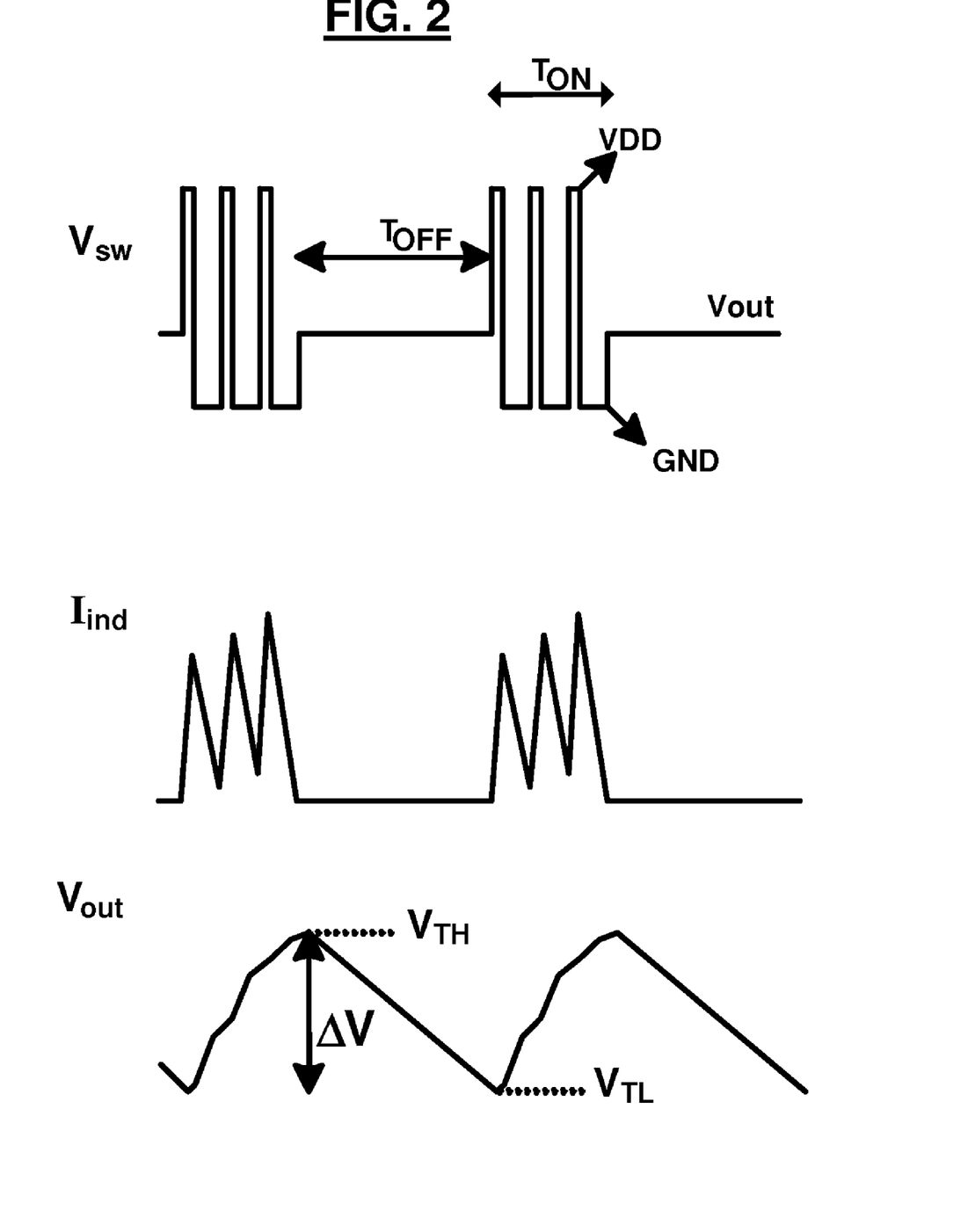
FIG. 2 are graphical representations illustrating waveforms of $V_{sw}$, inductor current, and $V_{out}$ according to the embodiments herein.

The voltage at vsw will be toggling between 0 and VDD (as shown in FIG. 2) with a duty cycle controlled by PWM control 104. The output voltage level starts increasing (FIG. 2) and the counter 106 starts counting up. Once the output voltage level exceeds the $V_{TH}$, the comparator 101 output becomes low and the switches 103 turn off. Counter 106 stops and stores its last value Non in a register 105. Non is compared with a desired value Non_ref using a digital comparator 102. If Non<Non_ref, this means that the vout ramps up faster than desired. The up/dn counter 107 counts down which causes the duty cycle of the output of PWM control 104 to be decreased. If Non>Non_ref, then vout ramps up slower than desired, and up/dn counter 107 counts up to increase the duty cycle of PWM control 104. It should be appreciated that block 107 does not have to be configured as an up/dn counter as other methods of digital control are also possible within the context of the embodiments herein.

The turn-on duration, represented by Non converges to the desired Non_ref at steady state. During turn-off, the current at the load $R_{Load}$ is only supplied by the filter capacitor 108. The higher the load current, the quicker the output voltage level will discharge. Therefore, the load current is sensed by measuring the turn-off time. That is, the time when the output voltage level, vout, discharges from $V_{TH}$ to $V_{TL}$ through the capacitor 108. This time is measured by counter 109, register 111, and comparator 110. The counter 109 starts counting when comparator 101 output becomes low (i.e., vout reaches $V_{TH}$ and switches 103 turn off). When the output voltage level reaches $V_{TL}$, counter 109 stops and stores its value Noff in the register 111. The value Noff is a measure of the load current. Moreover, Noff can be related to the load current according to the following equation:

$$N_{off} = \frac{C\Delta V}{I_{Load}T_{clk}} \qquad (6)$$

Conventional approaches to measure load current use small series resistance to convert current to voltage then measure the voltage. However, the series resistance significantly degrades the DC-DC converter efficiency. Conversely, according to the embodiments herein, the current is measured by measuring the turn-off period, represented by $N_{off}$. Information about load current can be used to optimize DC-DC converter efficiency at different load currents. There are two main sources of power loss in DC-DC converters: (1) resistive losses due to the series resistances of the switches and the inductor, and (2) capacitive (switching) power loss due to the large size of the switch drivers (switches 103).

Larger switch size results in low series resistance (lower resistive losses) but high capacitance (higher capacitive losses). At low load currents, resistive losses are smaller than capacitive losses. Therefore, it is better to reduce switch size to reduce its capacitance and increase its resistance in low current levels. At high current levels, resistive losses are dominant and it is better to increase switch size to optimize efficiency. The value of $N_{off}$, which is proportional to the load current, is used to control the size of the switches 103 to optimize its efficiency at all current levels.

Figure 3:
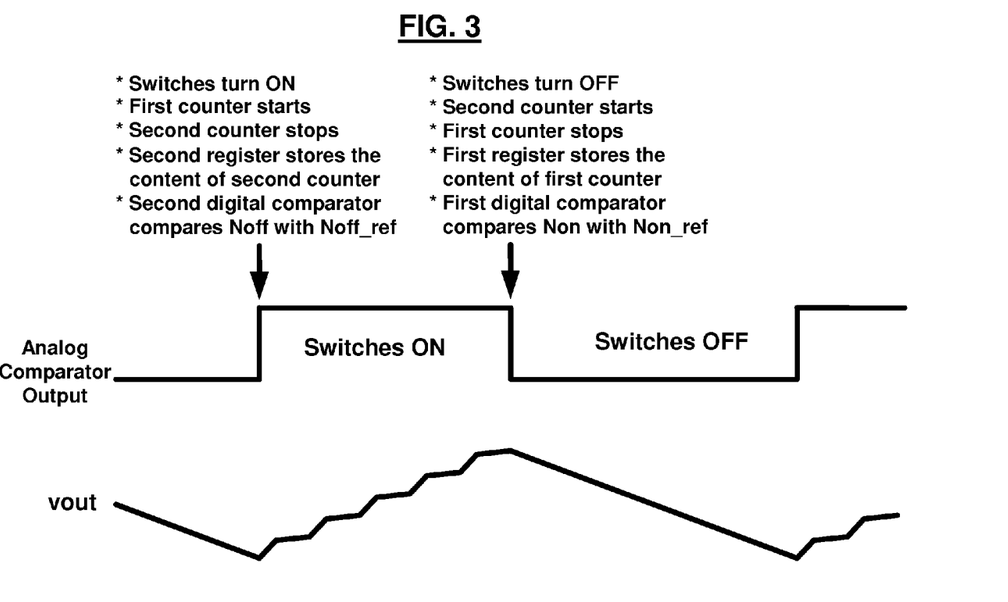
FIG. 3 is a graphical representation illustrating an analog comparator output switching from low to high and vice versa according to the embodiments herein.

FIG. 3 illustrates the output of the analog comparator 101 (of FIG. 1) when the switches $S_p$ and $S_n$ turn ON and OFF (i.e., go from low to high and vice versa). When the output of the analog comparator 101 causes the switches $S_p$ and $S_n$ to turn ON, the first counter 106 starts and the second counter 109 stops. Also, the second register 111 stores the content of the second counter 109 and the second digital comparator 110 compares Noff with Noff_ref. When the output of the analog comparator 101 causes the switches $S_p$ and $S_n$ to turn OFF, the second counter 109 starts and the first counter 106 stops. Also, the first register 105 stores the content of the first counter 106 and the first digital comparator 102 compares Non with Non_ref.

Figure 4:
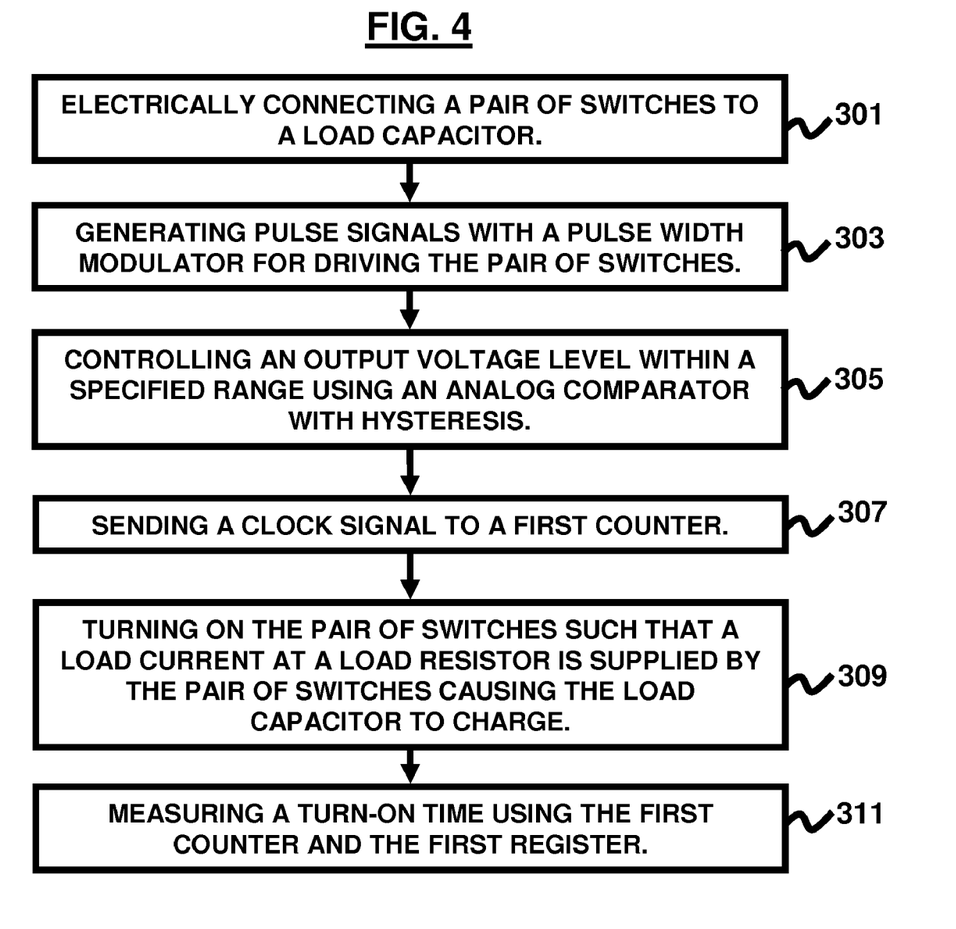
FIG. 4 is a flow diagram illustrating a preferred method according to an embodiment herein.

FIG. 4, with reference to FIGS. 1 through 3, is a flow diagram illustrating a method of controlling voltage in a DC-DC converter 100 according to an embodiment herein, wherein the method comprises electrically connecting (301) a pair of switches 103 to a load capacitor 108; generating (303) pulse signals with a pulse width modulator 104 for driving the pair of switches 103; controlling (305) an output voltage level, vout, within a specified range using an analog comparator 101 with hysteresis, wherein as the output voltage level, vout, rises above a high threshold level, $V_{TH}$, an analog comparator output becomes low and starts skipping clock pulses, wherein as the output voltage level, vout, drops below a low threshold level, $V_{TL}$, the analog comparator output becomes high and a clock signal, clk, is passed to the pair of switches 103 to charge the load capacitor 108, and wherein the analog comparator 101 is further adapted to compare the output voltage level, vout, with either the low threshold level, $V_{TL}$, or the high threshold level, $V_{TH}$; sending (307) a clock signal, clk, to a first counter 106, wherein when the analog comparator output becomes low the first counter 106 stops and stores its last value Non in a first register 105, wherein the first register 105 is operatively connected to a first digital comparator 102, wherein the first digital comparator 102 is operatively connected to an up-down counter 107, wherein the up-down counter 107 is operatively connected to the pulse width modulator 104; turning (309) on the pair of switches 103 such that a load current at a load resistor, $R_{Load}$, is supplied by the pair of switches 103, causing the load capacitor 108 to charge; and measuring (311) a turn-on time using the first counter 106 and the first register 105, wherein the turn-on-time is a time when the output voltage level, vout, discharges from the low threshold level, $V_{TL}$, to the high threshold level, $V_{TH}$, through the load capacitor 108, wherein the first counter 106 starts counting when the analog comparator output becomes high, which occurs when the output voltage level, vout, reaches the low threshold level, $V_{TL}$, and the pair of switches turn on 103, and wherein when the output voltage level, vout, reaches the high threshold level, $V_{TH}$, the analog comparator output becomes low and the first counter 106 stops counting and stores its last value, which represents the measured turn-on time, in the first register 105.

Preferably, the high threshold level, $V_{TH}$, minus the low threshold level, $V_{TL}$, defines a hysteresis width of the analog comparator 101. Additionally, a voltage, vsw, coming out of the pair of switches 103 preferably has a duty cycle controlled by the pulse width modulator 104. Also, the Non value is preferably compared with a desired value Non_ref using the first digital comparator 102. Preferably, if Non<Non_ref, the up-down counter 107 counts down to decrease a duty cycle of the pulse waves, and if Non>Non_ref, the up-down counter 107 counts up to increase the duty cycle of the pulse waves. Moreover, a turn-on duration of the pair of switches 103 represented by the Non value preferably converges to the Non_ref at steady state. Preferably, once the output voltage level, vout, exceeds the high threshold level, $V_{TH}$, the analog comparator output becomes low and the pair of switches 103 turn off. Additionally, when the output voltage level, vout, is lower than the low threshold level, $V_{TL}$, the analog comparator output is preferably high and the pulse signals are passed through the pair of switches 103. The method may further comprise operatively connecting a second register 111 to a second counter 109, wherein when the output voltage level, vout, reaches the low threshold level, $V_{TL}$, the second counter 109 stops counting and stores its value Noff in the second register 111, and wherein the value Noff is a measure of the load current.

The techniques provided by the embodiments herein may be implemented on an IC chip or using printable electronic technologies (not shown). The chip or printable electronic circuit design is created in a graphical computer programming language, and stored in a computer storage medium (such as a disk, tape, physical hard drive, or virtual hard drive such as in a storage access network). If the designer does not fabricate chips or printable electronic circuits or the photolithographic masks used to fabricate chips or printable electronic circuits, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII or CIF) for the fabrication of photolithographic masks, which typically include multiple copies of the chip design in question that are to be formed on a wafer or printed on a suitable substrate. The photolithographic masks are utilized to define areas of the wafer or printable electronic circuits (and/or the layers thereon) to be etched or otherwise processed or printed.

The resulting integrated circuit chips or printable electronic circuits can be distributed by the fabricator in raw wafer form (that is, as a single wafer that has multiple unpackaged chips), as a bare die, or in a packaged form or as individual printed circuits or in a sheet or roll of printed circuits. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip might then be integrated with other chips, discrete circuit elements, and/or other signal processing devices as part of either (a) an intermediate product, such as a mother or daughter-board, or (b) an end product. The end product can be any product that includes integrated circuit chip or chips and/or printed circuits, ranging from toys and other low-end applications to advanced computer products having a display, a keyboard or other input device, and a central processor.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A direct current to direct current (DC-DC) converter comprising:
    a pair of switches;
    a load capacitor operatively connected to said pair of switches;
    a pulse width modulator adapted to generate pulse signals for driving said pair of switches;
    an analog comparator with hysteresis adapted to control an output voltage level within a specified range, wherein as said output voltage level rises above a high threshold level, an analog comparator output becomes low and starts skipping clock pulses, wherein as said output voltage level drops below a low threshold level, said analog comparator output becomes high and a clock signal is passed to said pair of switches to charge said load capacitor, and wherein said analog comparator is further adapted to compare said output voltage level with either said low threshold level or said high threshold level;
    a first counter;
    a first register operatively connected to said first counter, wherein when said analog comparator output becomes low said first counter stops and stores its last value Non in said first register;
    a first digital comparator operatively connected to said first register; and
    an up-down counter operatively connected to said first digital comparator and said pulse width modulator,
    wherein during turn-on of said pair of switches, a load current at a load resistor is supplied by said pair of switches, and said load capacitor charges,
    wherein a turn-on time is a time when said output voltage level discharges from said low threshold level to said high threshold level through said load capacitor,
    wherein said turn-on time is measured by said first counter and said first register,
    wherein said first counter starts counting when said analog comparator output becomes high, which occurs when said output voltage level reaches said low threshold level and said pair of switches turn on, and
    wherein when said output voltage level reaches said high threshold level, said analog comparator output becomes low and said first counter stops counting and stores its last value, which represents the measured turn-on time, in said first register.

2. The DC-DC converter of claim 1, wherein said high threshold level minus said low threshold level defines a hysteresis width of said analog comparator.

3. The DC-DC converter of claim 1, wherein a voltage coming out of said pair of switches has a duty cycle controlled by said pulse width modulator.

4. The DC-DC converter of claim 1, wherein the Non value is compared with a desired value Non_ref using said first digital comparator.

5. The DC-DC converter of claim 4, wherein if Non<Non_ref, said up-down counter counts down to decrease a duty cycle of said pulse waves.

6. The DC-DC converter of claim 4, wherein if Non>Non_ref, said up-down counter counts up to increase the duty cycle of said pulse waves.

7. The DC-DC converter of claim 4, wherein a turn-on duration of said pair of switches represented by said Non value converges to said Non_ref at steady state.

8. The DC-DC converter of claim 1, wherein once said output voltage level exceeds said high threshold level, said analog comparator output becomes low and said pair of switches turn off.

9. The DC-DC converter of claim 1, wherein when said output voltage level is lower than said low threshold level, said analog comparator output is high and said pulse signals are passed through said pair of switches.

10. The DC-DC converter of claim 1, further comprising:
    a second counter; and
    a second register operatively connected to said second counter,
    wherein when said output voltage level reaches said low threshold level, said second counter stops counting and stores its value Noff in said second register, and
    wherein said value Noff is a measure of said load current.

11. A method of controlling voltage in a direct current to direct current (DC-DC) converter, said method comprising:
    electrically connecting a pair of switches to a load capacitor;
    generating pulse signals with a pulse width modulator for driving said pair of switches;
    controlling an output voltage level within a specified range using an analog comparator with hysteresis, wherein as said output voltage level rises above a high threshold level, an analog comparator output becomes low and starts skipping clock pulses, wherein as said output voltage level drops below a low threshold level, said analog comparator output becomes high and a clock signal is passed to said pair of switches to charge said load capacitor, and wherein said analog comparator is further adapted to compare said output voltage level with either said low threshold level or said high threshold level;
    sending a clock signal to a first counter, wherein when said analog comparator output becomes low said first counter stops and stores its last value Non in a first register, wherein said first register is operatively connected to a first digital comparator, wherein said first digital comparator is operatively connected to an up-down counter, wherein said up-down counter is operatively connected to said pulse width modulator;
    turning on said pair of switches such that a load current at a load resistor is supplied by said pair of switches, causing said load capacitor to charge; and
    measuring a turn-on time using said first counter and said first register, wherein said turn-on-time is a time when said output voltage level discharges from said low threshold level to said high threshold level through said load capacitor,
    wherein said first counter starts counting when said analog comparator output becomes high, which occurs when said output voltage level reaches said low threshold level and said pair of switches turn on, and
    wherein when said output voltage level reaches said high threshold level, said analog comparator output becomes low and said first counter stops counting and stores its last value, which represents the measured turn-on time, in said first register.

12. The method of claim 11, wherein said high threshold level minus said low threshold level defines a hysteresis width of said analog comparator.

13. The method of claim 11, wherein a voltage coming out of said pair of switches has a duty cycle controlled by said pulse width modulator.

14. The method of claim 11, wherein the Non value is compared with a desired value Non_ref using said first digital comparator.

15. The method of claim 14, wherein if Non<Non_ref, said up-down counter counts down to decrease a duty cycle of said pulse waves, and wherein if Non>Non_ref, said up-down counter counts up to increase the duty cycle of said pulse waves.

16. The method of claim 14, wherein a turn-on duration of said pair of switches represented by said Non value converges to said Non_ref at steady state.

17. The method of claim 11, wherein once said output voltage level exceeds said high threshold level, said analog comparator output becomes low and said pair of switches turn off.

18. The method of claim 11, wherein when said output voltage level is lower than said low threshold level, said analog comparator output is high and said pulse signals are passed through said pair of switches.

19. The method of claim 11, further comprising operatively connecting a second register to a second counter, wherein when said output voltage level reaches said low threshold level, said second counter stops counting and stores its value Noff in said second register, and wherein said value Noff is a measure of said load current.

20. A direct current to direct current (DC-DC) converter comprising:
   a pair of switches;
   a load capacitor operatively connected to said pair of switches;
   a pulse width modulator adapted to generate pulse signals for driving said pair of switches;
   an analog comparator with hysteresis adapted to control an output voltage level within a specified range, wherein as said output voltage level rises above a high threshold level, an analog comparator output becomes low and starts skipping clock pulses, wherein as said output voltage level drops below a low threshold level, said analog comparator output becomes high and a clock signal is passed to said pair of switches to charge said load capacitor, and wherein said analog comparator is further adapted to compare said output voltage level with either said low threshold level or said high threshold level;
   a first counter;
   a first register operatively connected to said first counter, wherein when said analog comparator output becomes low said first counter stops and stores its last value Non in said first register;
   a first digital comparator operatively connected to said first register;
   an up-down counter operatively connected to said first digital comparator and said pulse width modulator;
   a second counter; and
   a second register operatively connected to said second counter,
   wherein when said output voltage level reaches said low threshold level, said second counter stops counting and stores its value Noff in said second register,
   wherein said value Noff is a measure of said load current and controls the size of said pair of switches,
   wherein for low load current levels, said value of said Noff is high and said size of said pair of switches is decreased to reduce capacitive power losses, and
   wherein for high load current levels, said value of said Noff is low and said size of said pair of switches is increased to reduce resistive power losses.

* * * * *